W. P. SCOFIELD.
Nut-Lock.
No. 206,359. Patented July 23, 1878.
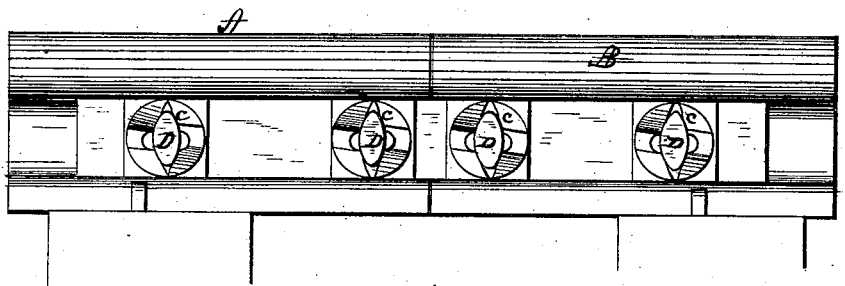
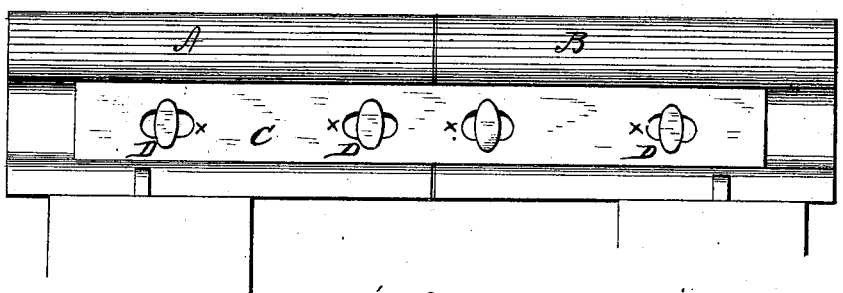
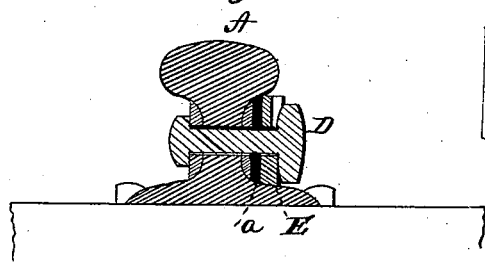 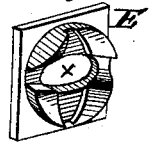

UNITED STATES PATENT OFFICE.

WALTER P. SCOFIELD, OF CHATTANOOGA, TENNESSEE.

IMPROVEMENT IN NUT-LOCKS.

Specification forming part of Letters Patent No. 206,359, dated July 23, 1878; application filed May 29, 1878.

*To all whom it may concern:*

Be it known that I, WALTER P. SCOFIELD, of Chattanooga, in the county of Hamilton, and in the State of Tennessee, have invented certain new and useful Improvements in Nut-Locks; and do hereby declare that the following is a full, clear, and exact description thereof, reference being had to the accompanying drawings, and to the letters of reference marked thereon, making a part of this specification.

The nature of my invention consists in the construction of a device for the purpose of connecting and locking railroad-rails, the peculiarities of which will be hereinafter more particularly described.

To enable those skilled in the art to make and use my invention, I will proceed to describe its construction.

In the accompanying drawings, making part of this specification, Figures 1 and 2 are side views of two rails, showing both sides of the locking device. Fig. 3 is a cross-section, and Fig. 4 is a detached perspective, of the nut or collar used.

In the figures, A and B represent two contiguous rails to be connected, and C represents an ordinary fish-plate, with the exception that the holes in it, instead of being round, are elongated, as seen in the direction of its length.

D D represent the pins or bolts which connect the fish-plates to the rails. These pins are not provided with screw-threads, but with oval projections upon each end, as represented, made of such size as suitable, the projection at one end being smaller than at the other, and of shape to correspond with the openings in the fish-plates and corresponding openings in the rails, so that in one position they pass through said openings readily, but when given a partial revolution they cannot return.

Between the washer or collar E and the fish-plate is inserted an india-rubber packing-collar, *a*, of such thickness as to be palpably elastic.

E represents a metallic collar, which is in exterior shape similar to that of a nut, having four sides, so that it can be handled by an ordinary wrench. The inner face of this collar may be made smooth or plain, or provided with small points or corrugations; but the outer face is provided with several cam-projections and a recess between these projections, in which the heads of the pins may lie. When the pin or bolt D is inserted the elongated ends are placed in a horizontal position to correspond with the holes in the plates and rails. When once in, the head of the pin is grasped by a suitable instrument, and by a quarter-turn its head passes up the cam on the collar E, and then drops into the recess in said collar made to receive it. The rubber, pressing the collar outward, prevents the bolt or pin from turning either way, and thus firmly secures the parts all together, thus forming a secure lock. The bolts can, by suitable force, be turned either forward or backward, and thus easily removed.

I disclaim, in a nut-locking device, the combination of a double-headed bolt having beveled shoulders, with a slotted or forked spring-washer, through which the head of the bolt is passed and turned to clamp the parts.

Having thus fully described my invention, what I claim as new, and desire to secure by Letters Patent, is—

The combination of the rails and the fish-plates, as constructed, with the bolts or pins D D, the cam and recessed faced collar E, and rubber *a*, constructed substantially as and for the purpose set forth.

In testimony that I claim the foregoing I have hereunto set my hand this 25th day of April, 1878.

WALTER P. SCOFIELD.

Witnesses:
R. G. JONES,
L. SCOFIELD, Jr.